United States Patent
Zheng et al.

(10) Patent No.: US 10,691,236 B2
(45) Date of Patent: Jun. 23, 2020

(54) TOUCH SCREEN AND MANUFACTURING METHOD THEREOF

(71) Applicants: BOE Technology Group Co., Ltd., Beijing (CN); Hefei Xinsheng Optoelectronics Technology Co., Ltd., Hefei (CN)

(72) Inventors: Ting Zheng, Bejing (CN); Ming Hu, Beijing (CN); Taofeng Xie, Beijing (CN); Tsung Chieh Kuo, Beijing (CN); Wenjie Shi, Beijing (CN); Zhanqi Xu, Beijing (CN); Xianlin Ding, Beijing (CN); Fuwei Zou, Beijing (CN); Cong Pang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 273 days.

(21) Appl. No.: 15/535,507

(22) PCT Filed: Sep. 14, 2016

(86) PCT No.: PCT/CN2016/098954
§ 371 (c)(1),
(2) Date: Jun. 13, 2017

(87) PCT Pub. No.: WO2017/118083
PCT Pub. Date: Jul. 13, 2017

(65) Prior Publication Data
US 2018/0059835 A1    Mar. 1, 2018

(30) Foreign Application Priority Data

Jan. 4, 2016    (CN) .......................... 2016 1 0004797

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

2011/0234507 A1    9/2011    Chou et al.
2012/0094071 A1    4/2012    Itoh et al.
(Continued)

FOREIGN PATENT DOCUMENTS

| CN | 102438822 A | 5/2012 |
| CN | 102467992 A | 5/2012 |

(Continued)

OTHER PUBLICATIONS

Dec. 19, 2016—(WO) International Search Report and Written Opinion Appn PCT/CN2016/098954 with English Tran.
(Continued)

*Primary Examiner* — Kenneth B Lee, Jr.
(74) *Attorney, Agent, or Firm* — Banner & Witcoff, Ltd.

(57) ABSTRACT

A touch screen and a manufacturing method thereof are provided. The touch screen includes a substrate; and an enhancement layer provided on a surface of the substrate. The enhancement layer is configured to improve strength of the substrate. The method of manufacturing the touch screen includes forming an enhancement layer on a surface of the substrate. The enhancement layer is configured to improve strength of the substrate.

14 Claims, 6 Drawing Sheets

(56) References Cited

U.S. PATENT DOCUMENTS

| | | | | |
|---|---|---|---|---|
| 2015/0022743 A1* | 1/2015 | Takao | ............... | G06F 3/041 |
| | | | | 349/12 |
| 2015/0077384 A1* | 3/2015 | Hong | ............... | G06F 3/044 |
| | | | | 345/174 |
| 2015/0123911 A1* | 5/2015 | Poliakov | ............ | G06F 3/041 |
| | | | | 345/173 |
| 2016/0364033 A1 | 12/2016 | Yang | | |
| 2017/0017319 A1 | 1/2017 | Du et al. | | |

FOREIGN PATENT DOCUMENTS

| | | | |
|---|---|---|---|
| CN | 104267859 A | | 1/2015 |
| CN | 104461157 A | | 3/2015 |
| CN | 104571721 A | | 4/2015 |
| CN | 104635991 A | | 5/2015 |
| CN | 104658640 A | | 5/2015 |
| CN | 204314858 U | * | 5/2015 |
| CN | 204314858 U | | 5/2015 |
| CN | 104834425 A | | 8/2015 |
| CN | 105677097 A | | 6/2016 |
| CN | 105892731 A | | 8/2016 |

OTHER PUBLICATIONS

Feb. 12, 2018—(CN) First Office Action Appn 201610004797.1 with English Tran.
Jul. 23, 2018—(CN) Second Office Action Appn 201610004797.1 with English Translation.

* cited by examiner

TOUCH SCREEN AND MANUFACTURING METHOD THEREOF

The application is a U.S. National Phase Entry of International Application No. PCT/CN2016/098954 filed on Sep. 14, 2016, designating the United States of America and claiming priority to Chinese Patent Application No. 201610004797.1, filed on Jan. 4, 2016. The present application claims priority to and the benefit of the above-identified applications and the above-identified applications are incorporated by reference herein in their entirety.

TECHNICAL FIELD

Embodiments of the present invention relates to a touch screen and a manufacturing method thereof.

BACKGROUND

A touch screen is a new human-computer interaction device, has a vivid and direct operation interface and complies with usage habits of human bodies, which can make entertainments and works more vivid and relax. Furthermore, capacitive touch panels are applied widely in art of consumer electronics, due to advantages of its high transparency, durability, and multiple point touch. OGS (One Glass Solution) is one of touch panels, and always dominates customer's experiences, because OGS has simple solutions and very high sensitivity.

The conventional OGS touch panel process generally adopts a 5 mask (metal bridge) process or a 6 mask (ITO bridge) process. A substrate warps and distorts after ITO coating is completed, and a forced state of a surface of the substrate is impacted and destructed by ITO which reduces strength of the surface of the substrate. Griffith micro-crack theory is as follows: Griffith believes that many tiny cracks or defects always exist in materials, so stress concentration occurs near the cracks and defects under exterior forces, and when the stress reach some extent, the cracks begin to extend which results in breakage. It can be known from the Griffith micro-crack theory that, the breakage is not caused by two portions of crystals being stretched to break along an entire interface of the two portions of the crystals, but is resulted from extension of the cracks. Many very tiny cracks exist on the surfaces of the substrate, and when the forced state is impacted and destroyed by the ITO, the strength of the surface of the substrate is reduced, so that a yield rate of touch screens is decreased greatly.

SUMMARY

An embodiment of the present invention provides a touch screen comprising a substrate; and an enhancement layer, provided on a surface of the substrate and configured to improve strength of the substrate.

Another embodiment of the present invention provides a method of manufacturing a touch screen, comprising: forming an enhancement layer on a surface of a substrate, wherein the enhancement layer is configured to improve strength of the substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
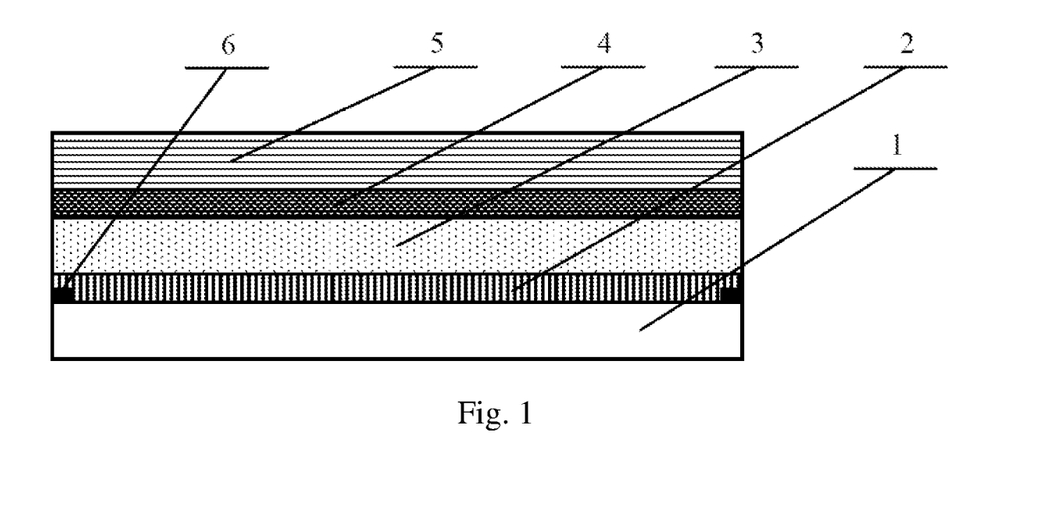
FIG. 1 is a schematic diagram of a touch screen of an embodiment of the present invention.

This embodiment provides a touch screen, as illustrated in FIG. 1, comprises a substrate 1, an enhancement layer provided on a surface of the substrate. The enhancement layer is configured to improve strength of the substrate. A probability that the substrate warps and distorts after being coated with ITO is reduced, by providing the enhancement layer, so that the strength of the surface of the substrate is increased when the forced state of the surface of the substrate is impacted and destroyed by the ITO. Thus, a possibility that extension of micro-cracks on the surface of the substrate results in breakage is reduced.

For example, the enhancement layer is a transparent photoresist material layer 2. A driving electrode 3, a sensing electrode 5, and an insulation layer 4 disposed between the driving electrode and the sensing electrode are provided on the transparent photoresist material layer 2.

The transparent photoresist material layer 2 is provided on the substrate 1, so that a distribution state of a compression stress layer of the substrate can be effectively protected from being changed, when the forced state of the surface of the substrate 1 is impacted and destroyed by the electrode layer. Thus, the strength of the surface of the product is increased.

For example, a thickness of the transparent photoresist material layer 2 is ranging from 0.4 to 5 μm.

For example, a refraction index of the transparent photoresist material layer 2 is larger than 1.67, which is a transparent photoresist material layer 2 with high refraction index. The transparent photoresist material layer with high refraction index has a light vanishing effect, and it can act as a vanishing layer, which can achieve customer demands as for the light vanishing effects while the procedure steps are decreased, and thus a process is simplified.

Photoresist is a kind of light-sensitive material, which can transfer a pattern on a mask to the surface of the substrate. In an embodiment of the present invention, the enhancement layer is made of the photoresist material. Photoresist comprises positive photoresist and negative photoresist. Regarding negative photoresist, exposed portions will become cross-linked state and polymerized due to chemical reaction and will be hardened after developing to retain on the surface of the substrate. For example, the enhancement layer can be made of the negative photoresist. However, the enhancement layer of the embodiment of the present invention is not limited to this, and it can be formed by any suitable photoresist material.

Figure 2:
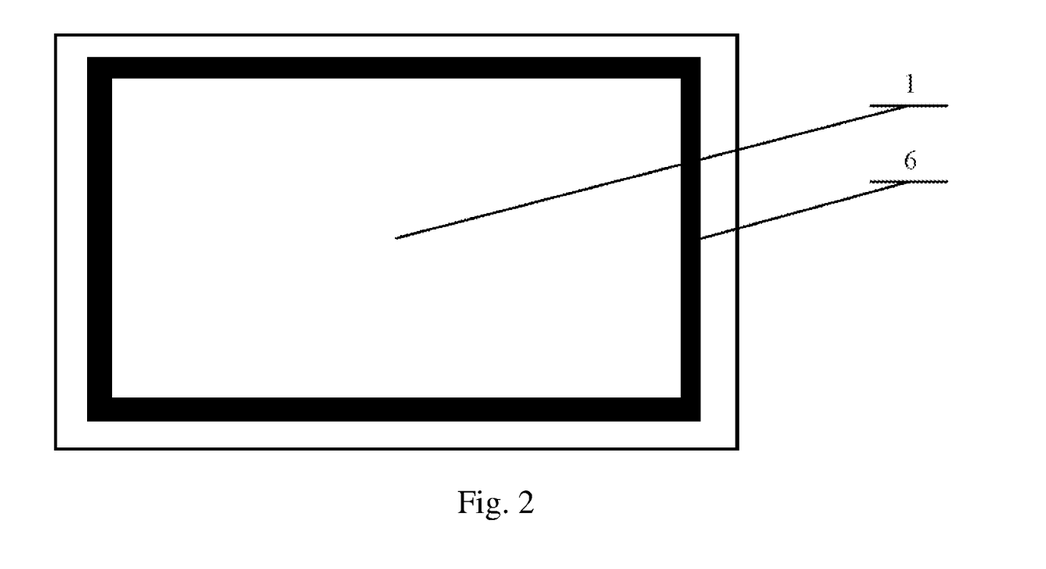
FIG. 2 is a top view of a glass substrate in which a black matrix is provided of an embodiment of the present invention.

For example, as illustrated in FIG. 2, a circle of black matrix 6 is provided on a periphery of the substrate, so that wiring on edges of the substrate are shielded, to prevent the wiring from being visible, and at the same time, prevent light on the edges from leakage.

Figure 3:
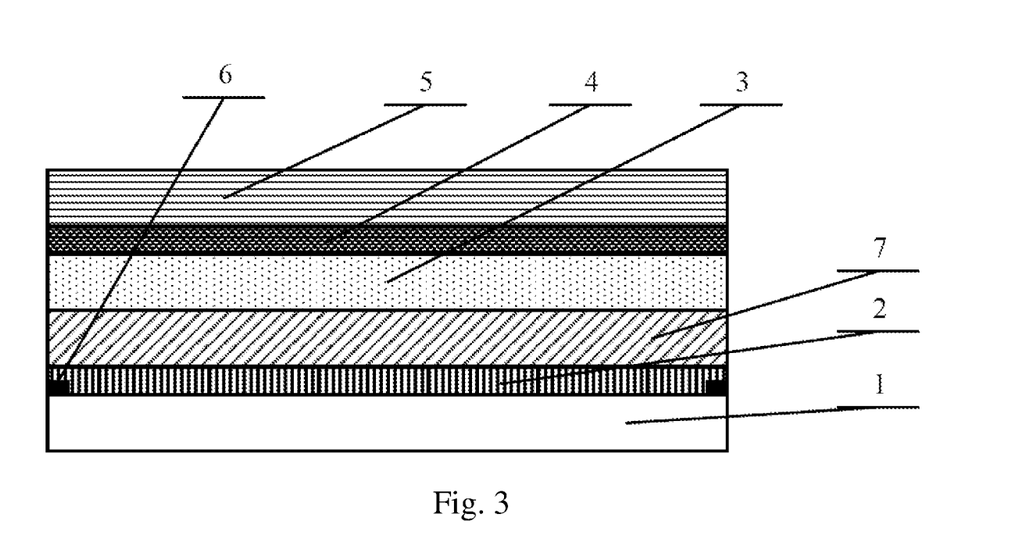
FIG. 3 is a schematic diagram of a touch screen of another embodiment of the present invention.

According to another embodiment of the present invention, as illustrated in FIG. 3, the touch screen comprises a substrate 1, an enhancement layer provided on a surface of the substrate. The enhancement layer is configured to improve strength of the substrate. The enhancement layer is a transparent photoresist material layer 2. A driving electrode 3, a sensing electrode 5, and an insulation layer 4 disposed between the driving electrode and the sensing electrode are provided on the transparent photoresist material layer 2. For example, a thickness of the transparent photoresist material layer 2 is ranging from 0.4 to 5 μm. Refraction index of the transparent photoresist material layer 2 is equal to 1.5, which is the transparent photoresist material having normal refraction index. A vanishing layer is required to be added after the transparent photoresist material 2 is formed, to achieve the light vanishing effects.

For example, a vanishing layer 7 is provided between the transparent photoresist material and the driving electrode. Materials of the vanishing layer 7 are $SiO_2$ and $Nb_2O_5$. A ratio of a film thickness of $SiO_2$ to that of $Nb_2O_5$ is 1:4. A thickness of the vanishing layer 7 is from 450 Å to 500 Å, so that the light vanishing effects can reach to a grade of 3.

Figure 4:
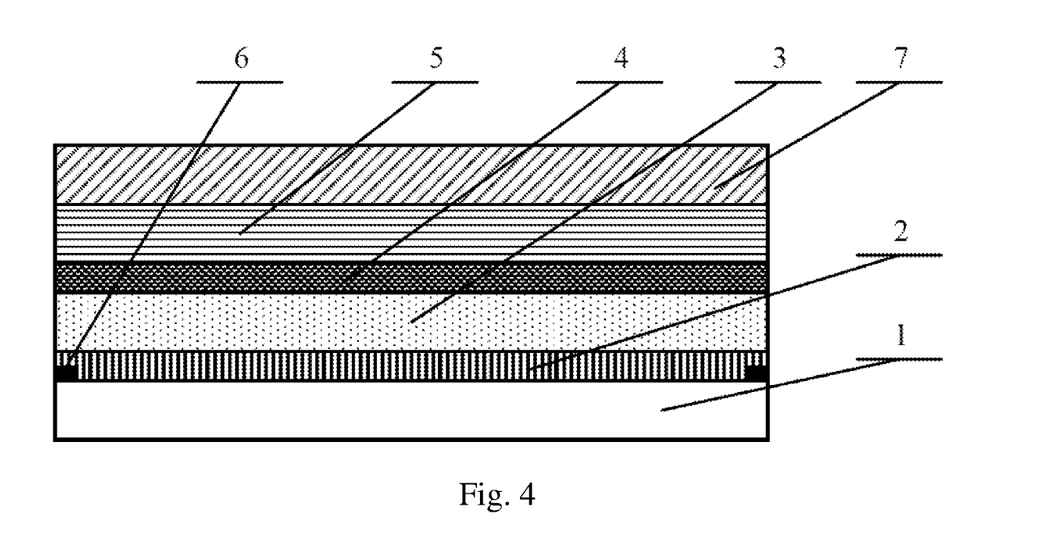
FIG. 4 is a schematic diagram of a touch screen of another embodiment of the present invention.

For example, the vanishing layer 7 can also be added after the transparent photoresist material layer 2 is formed, to achieve the light vanishing effects, as illustrated in FIG. 4. Material of the vanishing layer 7 is $SiN_xO_y$, a thickness of the vanishing layer is from 700 Å to 900 Å, and the refraction index of the vanishing layer 7 is from 1.6 to 1.65. This method can make the light vanishing effects to reach a grade of 1.

A circle of black matrix 6 is provided on the periphery of the substrate 1, so that the wiring on the edges of the substrate are shielded, to prevent the wring from being visible, and at the same time, prevent light on the edges from leakage.

Figure 5:
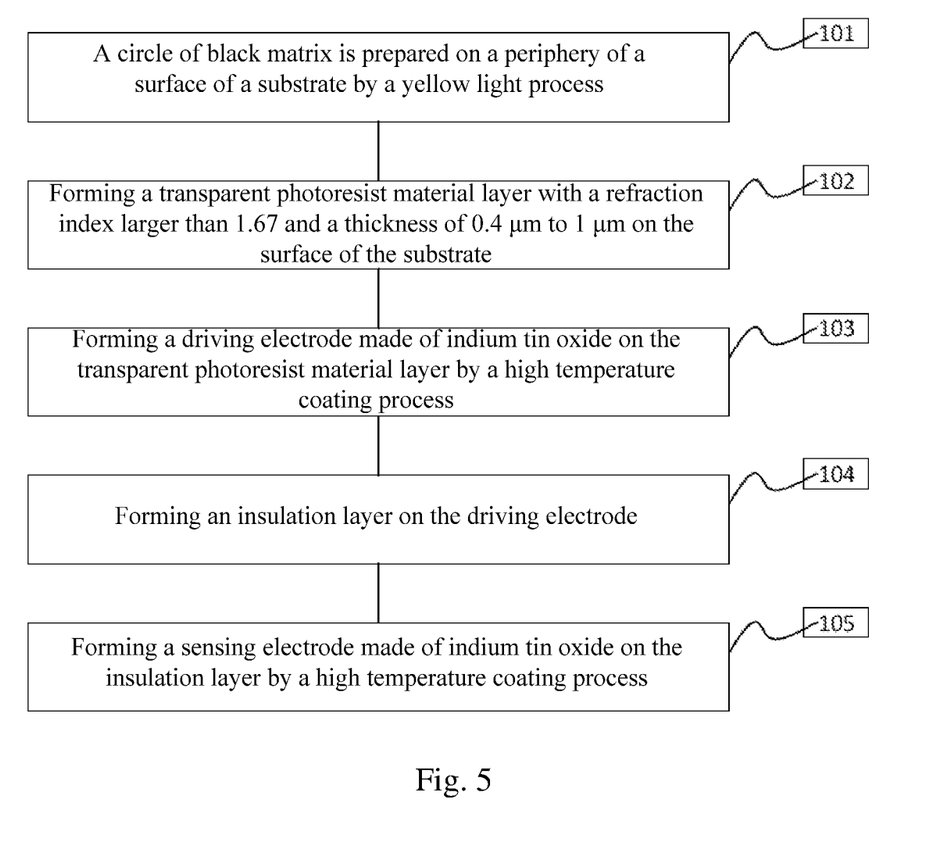
FIG. 5 is a flow chart of a method of manufacturing a touch screen of an embodiment of the present invention.

Embodiments of the present invention provide an embodiment of a method of manufacturing a touch panel, and FIG. 5 is a flow chart of this method. For example, this method comprises following steps.

101, A circle of black matrix is prepared on a periphery of a surface of a substrate by a yellow light process.

102, An enhancement layer is formed on the surface of the substrate, the enhancement layer is configured to improve strength of the substrate, the formed enhancement layer is a transparent photoresist material layer, and the formed transparent photoresist material layer has a thickness from 0.4 μm to 1 μm and is the transparent photoresist material layer having high refraction index larger than 1.67.

103, A driving electrode made of indium tin oxide is formed on the formed transparent photoresist material by a high temperature coating process under a temperature ranging from 230° C. to 250° C.

104, An insulation layer is formed on the driving electrode.

105, A sensing electrode made of indium tin oxide is formed on the formed insulation layer by a high temperature coating process under a temperature ranging from 230° C. to 250° C.

Figure 6:
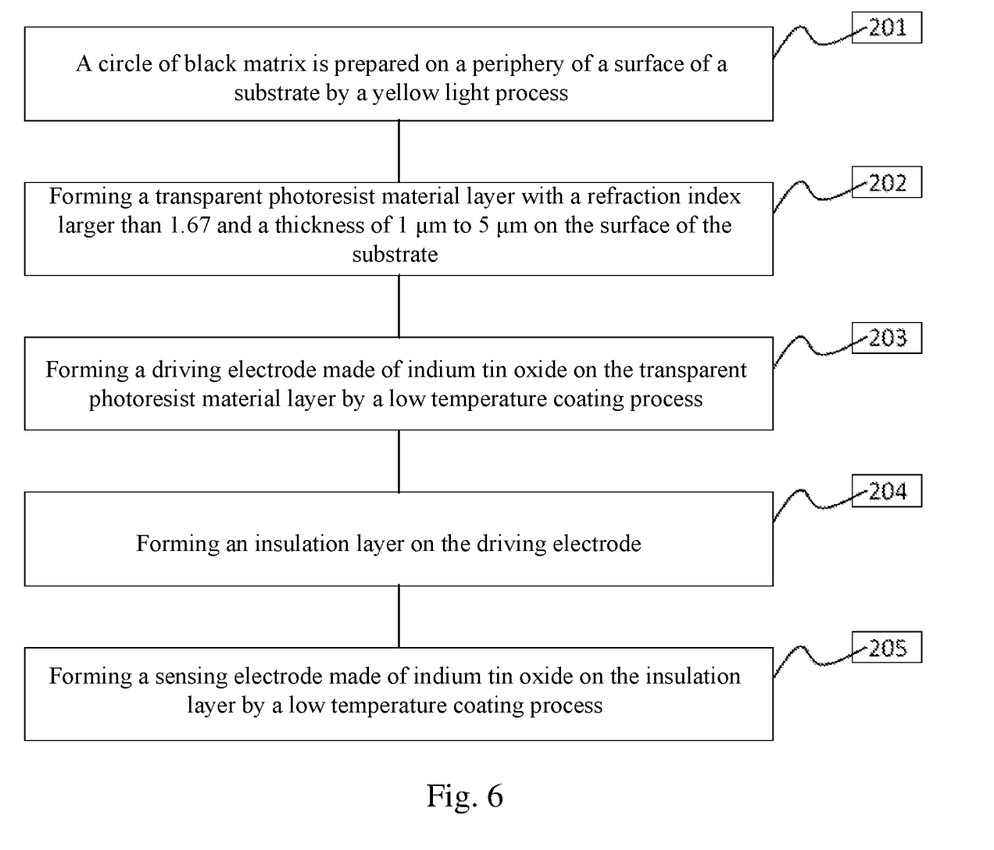
FIG. 6 is a flow chart of a method of manufacturing a touch screen of another embodiment of the present invention.

For example, FIG. 6 is a flow chart of a method of manufacturing a touch panel according to another embodiment of the present invention. In this method, the transparent photoresist material layer formed in step 202 has a thickness of 1 μm to 5 μm, and a refraction index larger than 1.67. The driving electrode layer formed in the step corresponding to step 103 and the sensing electrode formed in the step corresponding to step 105 adopt a low temperature coating process. For example, as illustrated in FIG. 6, steps 201 and 204 are the same as steps 101 and 104, respectively. In step 203, a driving electrode made of indium tin oxide is formed on the formed transparent photoresist material by a low temperature coating process under a temperature ranging from 30° C. to 80° C. and an anneal process parameter of 230-250° C./30 min; in step 205, a sensing electrode made of indium tin oxide is formed on the formed insulation layer by a low temperature coating process under a temperature ranging from 30° C. to 80° C. and an anneal process parameter of 230-250° C./30 min.

Figure 7:
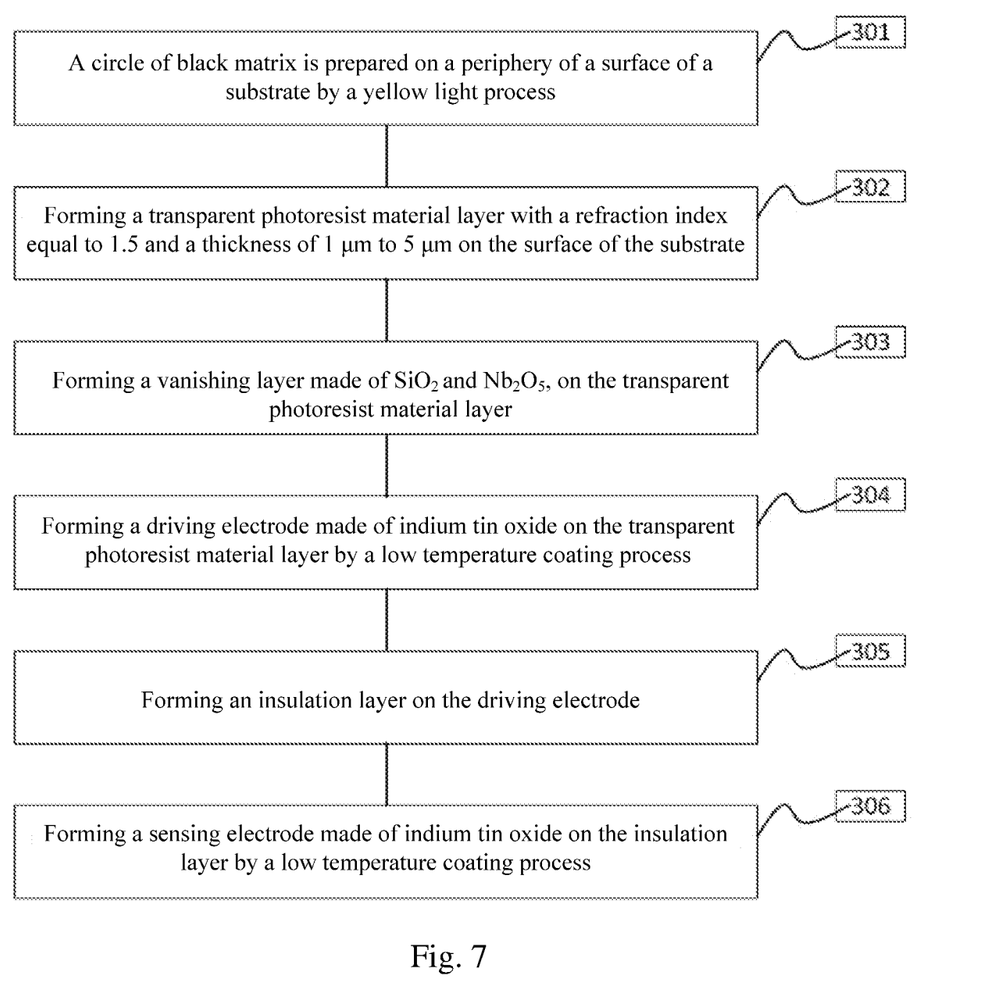
FIG. 7 is a flow chart of a method of manufacturing a touch screen of another embodiment of the present invention.

An embodiment of the present invention provides another method of manufacturing a touch panel, and FIG. 7 is a flow chart of this method. For example, this method comprises following steps.

301, A circle of black matrix is prepared on a periphery of a surface of the substrate by a yellow light process.

302, An enhancement layer is formed on the surface of the substrate, the enhancement layer is configured to improve strength of the substrate, the formed enhancement layer is a transparent photoresist material layer, and the formed transparent photoresist material layer has a thickness from 1 μm to 5 μm and is the transparent photoresist material layer having a normal refraction index equal to 1.5.

303, A vanishing layer is formed on the formed transparent photoresist material, materials of the vanishing layer are $SiO_2$ and $Nb_2O_5$, a ratio of a film thickness of $SiO_2$ to that of $Nb_2O_5$ is 1:4, and a thickness of the vanishing layer is from 450 Å to 500 Å.

304, A driving electrode made of indium tin oxide is formed on the formed vanishing layer by a low temperature coating process under a temperature is ranging from 30° C. to 80° C. and an anneal process parameter of 230-250° C./30 min;

305, An insulation layer is formed on the driving electrode;

306, A sensing electrode made of indium tin oxide is formed on the formed insulation layer by a low temperature coating process under a temperature ranging from 30° C. to 80° C. and an anneal process parameter of 230-250° C./30 min.

Figure 8:
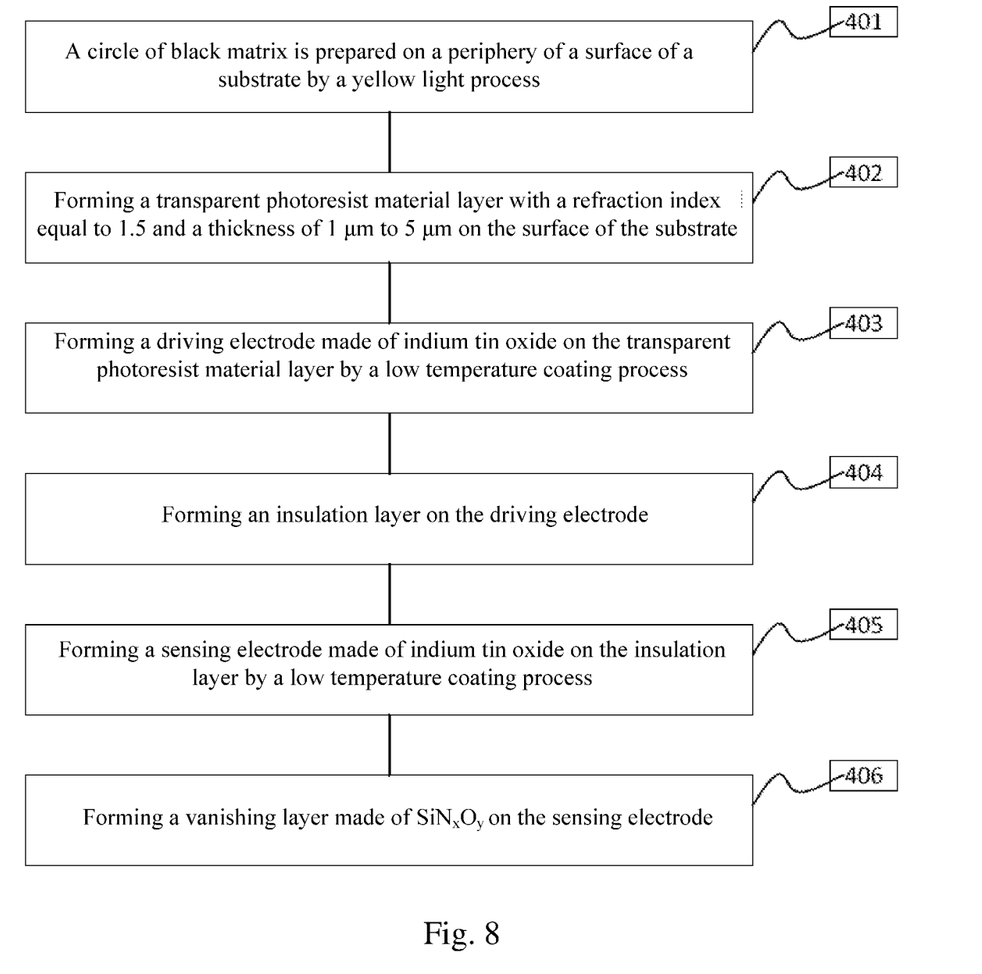
FIG. 8 is a flow chart of a method of manufacturing a touch screen of another embodiment of the present invention.

For example, FIG. 8 is a flow chart of a method of manufacturing a touch panel according to another embodiment of the present invention. As is illustrated in FIG. 8, steps 401 and 402 are the same as steps 301 and 302, respectively. In step 403, a driving electrode made of indium tin oxide is formed on the formed transparent photoresist material formed in step 402 (in which an enhancement layer is formed on the surface of the substrate, the enhancement layer is configured to improve strength of the substrate, and the formed enhancement layer is a transparent photoresist material layer) by a low temperature coating process under a temperature ranging from 30° C. to 80° C. and an anneal process parameter is 230-250° C./30 min. In step 404, an insulation layer is formed on the driving electrode. In step 405, a sensing electrode made of indium tin oxide is formed on the formed insulation layer by a low temperature coating process with a temperature ranging from 30° C. to 80° C. and an anneal process parameter of 230-250° C./30 min. In step 406, a vanishing layer is formed on the sensing electrode, a material of the vanishing layer is $SiN_xO_y$, a thickness of the formed vanishing layer is from 700 Å to 900 Å, and a refraction index of the vanishing layer is from 1.6 to 1.65.

For example, as illustrated in FIG. 7, the thickness of the enhancement layer (i.e., the transparent photoresist layer) of step 302 in FIG. 7 can also be changed to 0.4 μm to 1 μm. At the same time, steps 304 and 306 are changed to form the driving electrode and the sensing electrode made of indium tin oxide by a high temperature coating process under a temperature ranging from to 230° C. to 250° C.

For example, as illustrated in FIG. 8, the thickness of the transparent photoresist layer of step 402 in FIG. 8 can also be changed to 0.4 μm to 1 μm. At the same time, steps 403 and 405 are changed to form the driving electrode and the sensing electrode made of indium tin oxide by a high temperature coating process under a temperature ranging from to 230° C. to 250° C.

What are described above is related to the illustrative embodiments of the disclosure only and not limitative to the scope of the disclosure; the scopes of the disclosure are defined by the accompanying claims.

The application claims priority to the Chinese patent application No. 201610004797.1, filed on Jan. 4, 2016, the entire disclosure of which is incorporated herein by reference as part of the present application.

The invention claimed is:

1. A touch screen, comprising:
a substrate; and
an enhancement layer, provided on a surface of the substrate, the enhancement layer being in direct contact with the surface of the substrate and configured to improve strength of the substrate, wherein
the enhancement layer is a single layer of transparent photoresist material layer,
the touch screen further comprises a driving electrode on the substrate and a sensing electrode on the driving electrode,
the touch screen further comprises a vanishing layer, the vanishing layer is provided between the enhancement layer and the driving electrode, and
the vanishing layer comprises a first film layer and a second film layer which are made of different materials and have different film thicknesses, wherein the first film layer is in direct contact with the enhancement layer and the second film layer, while the second film layer is in direct contact with the first film layer and the driving electrode.

2. The touch screen of claim 1, wherein the transparent photoresist material has a refraction index larger than 1.67.

3. The touch screen of claim 1, further comprising an insulation layer disposed between the driving electrode and the sensing electrode.

4. The touch screen of claim 1, wherein the transparent photoresist material has a refraction index equal to 1.5.

5. The touch screen of claim 1, wherein materials of the first film layer and the second film layer of the vanishing layer are $SiO_2$ and $Nb_2O_5$, respectively, and a ratio of a film thickness of the first film layer and a film thickness of the second film layer is 1:4.

6. The touch screen of claim 5, wherein the entire vanishing layer has a thickness in a range of 450 Å to 500 Å.

7. The touch screen of claim 1, wherein the vanishing layer has a refraction index of 1.6 to 1.65.

8. The touch screen of claim 1, wherein the transparent photoresist material layer has a thickness of 0.4 to 5 μm.

9. A method of manufacturing a touch screen, comprising:
forming an enhancement layer on a surface of a substrate, wherein the enhancement layer is a single layer of transparent photoresist material layer and is configured to improve strength of the substrate;
forming a driving electrode on the enhancement layer and forming a sensing electrode on the driving electrode; and
forming a vanishing layer between the enhancement layer and the driving electrode,
wherein the vanishing layer comprises a first film layer and a second film layer which are made of different materials and have different film thicknesses, and wherein
the first film layer is in direct contact with the enhancement layer and the second film layer, while the second film layer is in direct contact with the first film layer and the driving electrode.

10. The method of claim 9, wherein the formed transparent photoresist material layer has a thickness of 0.4 μm to 1 μm, a driving electrode and a sensing electrode made of indium tin oxide are formed on the formed transparent photoresist material under a temperature from 230° C. to 250° C.

11. The method of manufacturing the touch screen of claim 9, wherein the formed transparent photoresist material layer has a thickness of 1 μm to 5 μm, a driving electrode and a sensing electrode made of indium tin oxide are formed on the formed transparent photoresist material under a temperature from 30° C. to 80° C., and the formed driving electrode and the sensing electrode are annealed under a temperature from 230° C. to 250° C. for 30 minutes.

12. The method of manufacturing the touch screen of claim 10, wherein the formed transparent photoresist material has a refraction index larger than 1.67.

13. The method of manufacturing the touch screen of claim 10, wherein the formed transparent photoresist material has a refraction index equal to 1.5, and a vanishing layer is formed on the substrate.

14. The method of manufacturing the touch screen of claim 9, wherein materials of the first film layer and the second film layer of the vanishing layer are $SiO_2$ and $Nb_2O_5$, respectively, and a ratio of a film thickness of the first film layer and a film thickness of the second film layer is 1:4.

* * * * *

UNITED STATES PATENT AND TRADEMARK OFFICE
CERTIFICATE OF CORRECTION

PATENT NO. : 10,691,236 B2
APPLICATION NO. : 15/535507
DATED : June 23, 2020
INVENTOR(S) : Zeng et al.

It is certified that error appears in the above-identified patent and that said Letters Patent is hereby corrected as shown below:

On the Title Page

Item (72) Inventors, Column 1, Line 1:
Delete "Ting Zheng" and insert --Ting Zeng--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*